A. SMALLWOOD.
FURNACE FOR HEATING AND TREATING ARTICLES.
APPLICATION FILED SEPT. 19, 1916.

1,312,927.

Patented Aug. 12, 1919.
2 SHEETS—SHEET 1.

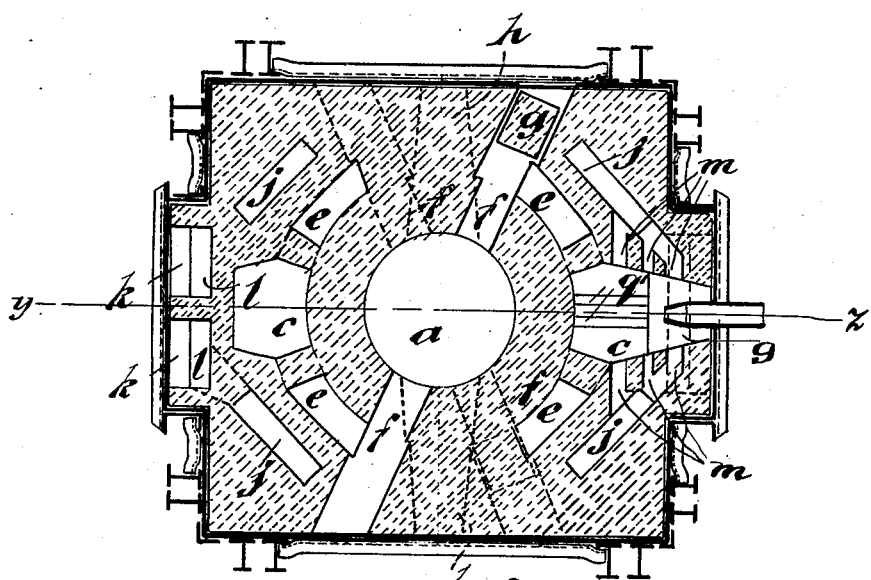
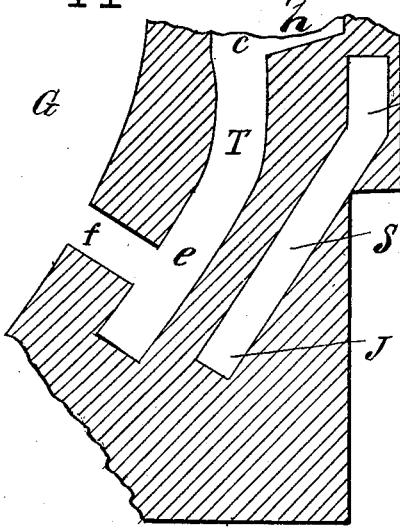

UNITED STATES PATENT OFFICE.

ALFRED SMALLWOOD, OF HIGHGATE, LONDON, ENGLAND.

FURNACE FOR HEATING AND TREATING ARTICLES.

1,312,927.  Specification of Letters Patent.  Patented Aug. 12, 1919.

Application filed September 19, 1916. Serial No. 121,073.

*To all whom it may concern:*

Be it known that I, ALFRED SMALLWOOD, a subject of the Kingdom of Great Britain, residing at 42 Hargrave Park, Highgate, London, N., in the county of Middlesex, England, have invented a certain new or Improved Furnace for Heating and Treating Articles, of which the following is a specification.

This invention comprises a new or improved furnace for heating, hardening, tempering, annealing, carbonizing, and other processes, and it has for its purpose to provide a furnace particularly adapted for the satisfactory heating or treatment of long articles, such as guns, locomotive connecting rods, and the like, and which, when heated or treated in a horizontal position, are liable to warp. With this object in view, therefore, the articles are adapted to be heated while in a vertical position in which they may be in tension, and the furnace of the present invention furthermore provides for a particularly even and effective heating along the entire length of the article.

In order that this invention may be clearly understood and readily carried into practice, reference may be had to the appended explanatory sheets of drawings, upon which:—

Fig. 2 is a sectional view taken on line $x$—$y$ of Fig. 1.

Fig. 3 is a sectional view taken along the line $z$—$z$ of Fig. 1.

Figure 1:
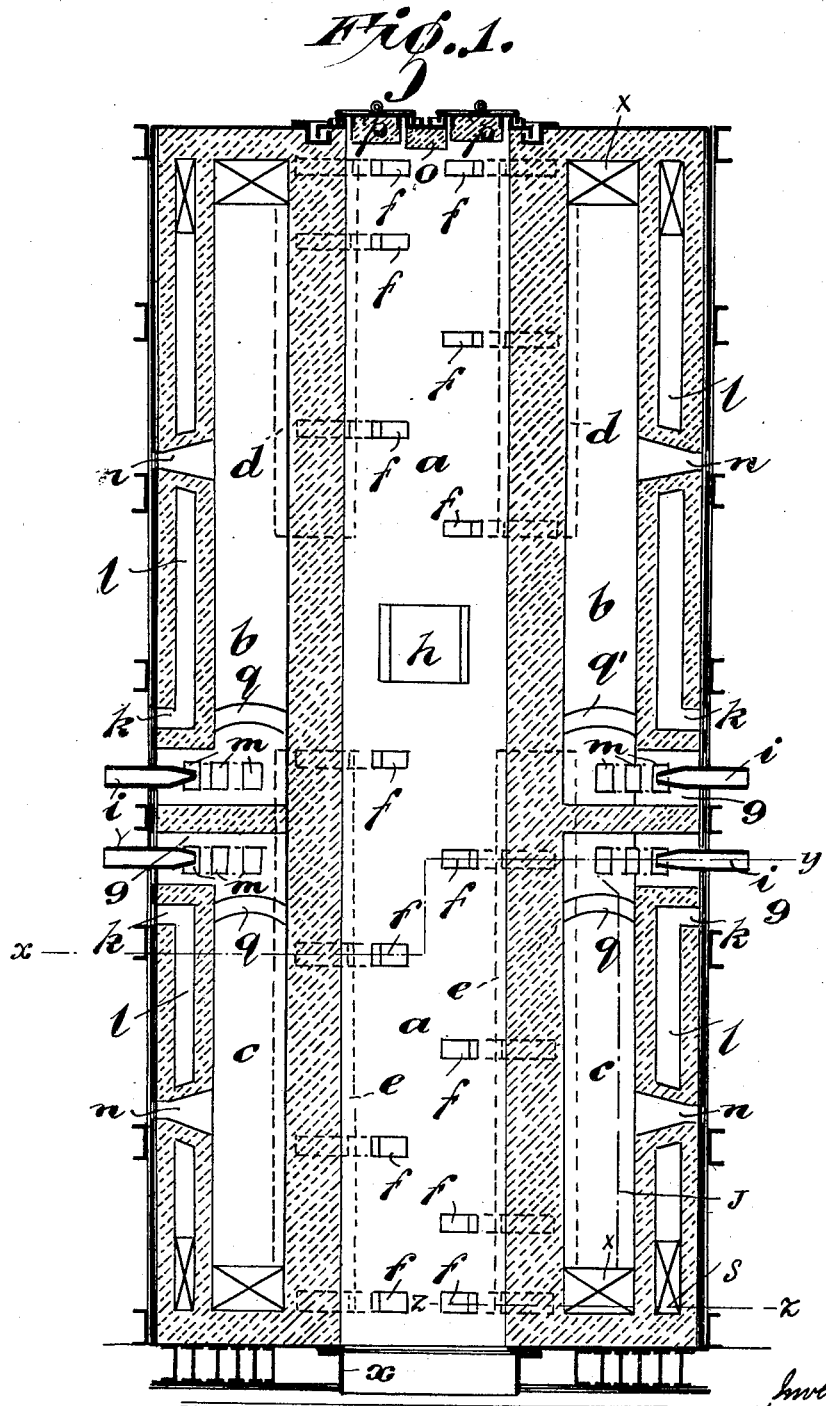
Figure 1 is a sectional elevation of the furnace.

In a convenient embodiment of the present invention, the furnace takes the form of a vertical building having a central vertical heating chamber $a$. In the wall or walls of the building surrounding the heating chamber a combustion chamber or combustion chambers is or are incorporated. This combustion chamber or these combustion chambers are adapted to receive flame or furnace gases, which passes or pass along the combustion chamber or chambers, and subsequently into heat flues, which are also disposed in the wall or walls of the building, and which heat flues are in communication with the heating chamber by apertures or ports disposed at intervals along its vertical length. These apertures or ports are adapted to be individually regulated so that more or less heat can be supplied at any level in the heating chamber.

Conveniently the primary source of heat is introduced at a mid level in relation to the height of the heating chamber. There may be at one, or at each of two or any suitable number of points in the circumference or perimeter of the furnace, two inlets for the primary heating medium. In the arrangement shown in Figs. 1 and 2, two inlets 9 9 are disposed at each of two diametrically opposite points in the furnace. These are superposed, and one may communicate with a combustion chamber $b$ extending upwardly substantially to the top of the furnace, the other communicating with a combustion chamber $c$ extending downwardly substantially to the bottom of the furnace. $q'$ $q'$ represent baffles. Each upwardly extending combustion chamber $b$ may communicate at the top with two heat flues $d$, $d$ which extend downwardly one on each side of the combustion chamber. In like manner each downwardly extending combustion chamber $c$ may communicate at the bottom with two heat flues $e$ $e$ disposed one on each side of the combustion chamber and extending upwardly. A series of distributing and staggered ports $f$, each individually regulable, offer communication between the several heat flues $d$, $d$, $d$, $d$, $e$, $e$, $e$, $e$ and the interior of the heating chamber $a$. $g$ Fig. 2, indicates a form of bung, and provision for operating same which may be incorporated for regulating the juncture of each of the ports $f$ with its respective heat flue $d$ or $e$ to provide for this individual regulation.

The outlet or outlets $h$ $h$ from the heating chamber $a$ may be disposed at a mid position in its height and two are preferably incorporated, at diametrically opposite points. The furnace may be adapted to work by gaseous, liquid, or solid fuel, $i$, $i$, being gaseous or liquid fuel fittings in the arrangements shown in the drawings, and provision may be made for heating the air for combustion. For this purpose vertical air flues $j$, $j$, $j$, $j$ may be incorporated in the wall or walls of the furnace at positions adjacent to, and on the outer sides of, the heat flues $d$, $e$, and thus the air is heated by radiation, and at the same time the radiation of heat externally of the furnace building is counteracted. The air may primarily enter the furnace at $k$ and may pass upwardly or downwardly along flues $l$ which communicate at their upper or lower extremities with the flues $j$ and said flues $j$ then communicate at their other extremities with the space in the vicinity of the fuel fittings $i, i$, as for instance by ports $m$. $n, n, n, n$ represent sight holes.

The furnace may be closed at the top by a suitable removable closure member $o$, and in such closure member other minor removable closure members $p$ may be incorporated so that the latter may facilitate individual introduction of the goods when several articles are heated at the same time, while the main closure member $o$ may permit of the introduction of a single larger article.

It will be seen that in operation air is sucked in through openings $k$ and such air passes around the sight holes $m$ through the passage $l$ and through the passage $s$ at the bottom of the furnace to the duct $j$, reference being had to Fig. 3. Through duct $j$ the air reaches the uppermost, or lowermost part of said ducts and emerges into the passage $c$ at a point adjacent to the burners $i$, mingling with the fuel and producing an intensely hot flame which is projected down the passage $c$ until it reaches a passage $t$, situated at the lowermost portion of $c$ and so passes into the passage $e$ from which it is distributed through the ports $f$ into the main chamber $a$, the product of combustion passes out through the exit $h$ from which they may be conducted into any suitable smokestack.

It will be noted that by the above arrangement the air, by virtue of passing through the passage $l$ and up through the passage $j$, before combining with the flame distributed by the burners $i$, is heated by reason of the vicinity of the heat conducting passages $c$ and $e$.

It will also be noted that I have merely described the action of the air and products of combustion upon one of the burners and associated passages, it being of course understood that a similar action takes place among all of the burners and passages.

The tank for containing oil may have a hollow wall 6 which may contain water for cooling purposes.

What I claim as my invention and desire to secure by Letters Patent is:—

1. A furnace comprising a vertically disposed heating chamber, a source of heat located outside of said chamber and approximately intermediate its extremities, combustion chambers extending upwardly and downwardly from said source of heat, flues provided with ports extending through to the heating chamber, such flues being in communication with the outer end of the combustion chamber.

2. A furnace comprising a vertically disposed heating chamber a source of heat located outside of said chamber and approximately intermediate its extremities, combustion chambers located at diametrically opposite sides of said heating chamber, a pair of flues provided for each of said combustion chambers, such flues being formed with ports extending through to the heating chamber, each pair of flues being in communication with the outer end of its respective combustion chamber.

3. A furnace comprising a vertically disposed heating chamber, a source of heat located outside of said chamber and approximately intermediate its extremities, combustion chambers extending upwardly and downwardly from said source of heat, flues provided with ports extending through to the heating chamber, said flues being in communication with the outer end of the combustion chamber, and air passages having communication with the outer atmosphere at one of their extremities, their opposite ends terminating in the combustion chamber adjacent to the source of heat, such air passages being located in proximity to the combustion chambers and flues throughout their entire length whereby the air traveling through them will become heated before being introduced into the combustion chambers.

4. A furnace, comprising a vertically disposed heating chamber having heat distributing ports located at intervals in the height of the chamber, means provided in connection with said ports for regulating the flow of gases therethrough, and vertical heat flues provided in the wall of the chamber being in communication with said ports.

5. A furnace, comprising a vertically disposed heating chamber, vertical combustion chambers, a source of heat located within said combustion chambers, and flues provided with ports extending through to the heating chamber, said flues being in communication with the outer end of the combustion chambers.

6. A furnace, comprising a goods chamber, vertical combustion chambers communicating with said goods chamber, and vertical heat flues communicating with said goods chamber and combustion chambers, the combustion chambers and heat flues being located within the wall of the goods chamber.

7. A furnace, comprising a vertically disposed heating chamber, combustion chambers located at diametrically opposite sides of said heating chamber, a source of heat located in said combustion chamber, a pair of flues provided for each of said combustion chambers, said flues being formed with ports extending through to the heating chamber, each pair of flues being in communication with the outer end of its respective combustion chamber.

8. A furnace, comprising a vertically disposed heating chamber, combustion chambers, a source of heat located in said combustion chambers, flues provided with ports extending through to the heating chamber, said flues being in communication with the outer end of the combustion chamber, and air passages having communication with the outer atmosphere at one of their extremities, the opposite ends terminating in the combustion chamber adjacent to the source of heat, said air passages being located in proximity to the combustion chambers, and flues throughout their entire length, whereby the air traveling through them will become heated before being introduced into said combustion chambers.

9. A furnace, comprising a vertically disposed heating chamber, combustion chambers, a source of heat located in said combustion chambers, heat flues provided with ports extending through to the heating chambers, said flues being in communication with the outer end of the combustion chambers, and air flues disposed within the wall of the furnace so as to be heated by said heat flues.

10. A furnace, comprising a vertically disposed heating chamber, combustion chambers, a source of heat located in said combustion chambers, heat flues provided with ports extending through to the heating chambers, said flues being in communication with the outer end of the combustion chambers, and air flues disposed within the wall of the furnace on the outer side of such heat flues.

In witness whereof I have hereunto set my hand.

ALFRED SMALLWOOD.

Copies of this patent may be obtained for five cents each, by addressing the "Commissioner of Patents, Washington, D. C."